J. H. ELWARD.

Harvester.

No. 6,359. Reissued March 30, 1875.

Witnesses:
Alex Mahon
John G. Center

Inventor:
John H. Elward,
by A. M. Pritt,
Attorney.

THE GRAPHIC CO. PHOTO-LITH. 39 & 41 PARK PLACE, N.Y.

BEST AVAILABLE COPY

UNITED STATES PATENT OFFICE.

JOHN H. ELWARD, OF ST. PAUL, MINNESOTA, ASSIGNOR TO HIMSELF AND WAYLAND S. GOODHUE.

IMPROVEMENT IN HARVESTERS.

Specification forming part of Letters Patent No. 113,990, dated April 25, 1871; reissue No. 6,359, dated March 30, 1875; application filed March 5, 1875.

*To all whom it may concern:*

Be it known that I, JOHN H. ELWARD, formerly of Polo, Illinois, but now of St. Paul, county of Ramsey and State of Minnesota, have invented certain new and useful Improvements in Harvesting-Machines, of which the following is a full, clear, and exact description, reference being had to the accompanying drawings, making part of this specification, in which—

Figure 1:
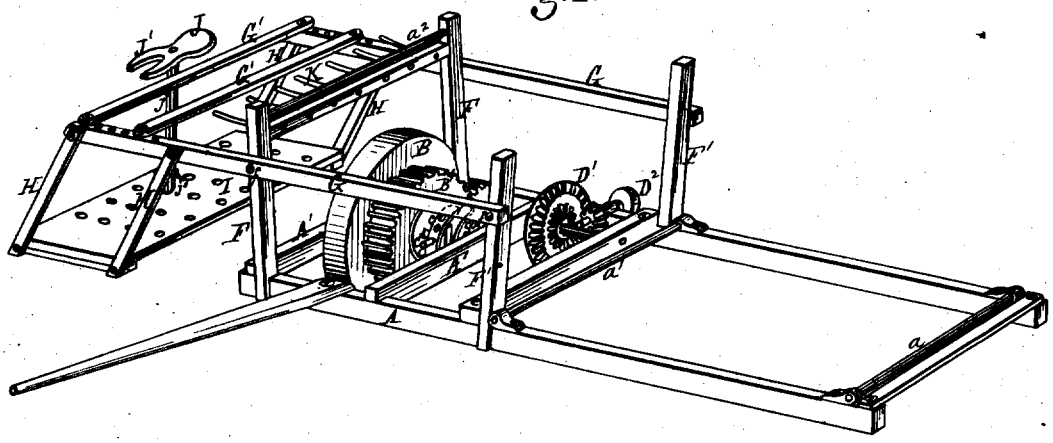
Figure 2:
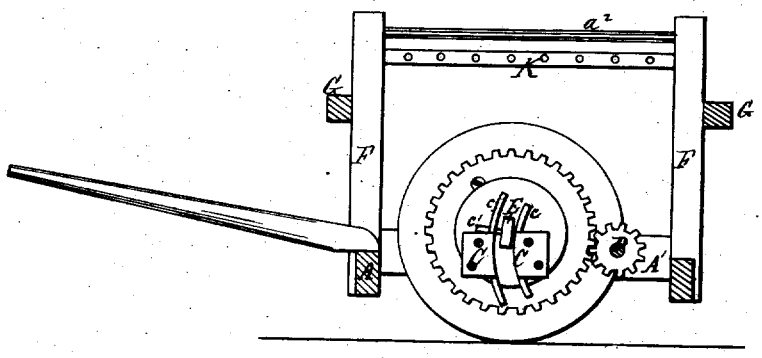
Figure 3:
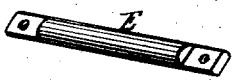

Figure 1 is a perspective view of a harvesting-machine embracing my improvements. Fig. 2 is a vertical longitudinal section of the main frame at the inner side of the driving-wheel, and Fig. 3 is a perspective view of the main drive-wheel axle detached.

Similar letters of reference denote corresponding parts in all the figures.

My invention consists, first, in a novel construction and arrangement of the binders' platform and binders's seat or support, the former being suspended from overhanging bars or supports, and the latter being made adjustable to varying positions for adapting them more perfectly to the character of the work, and to permit the binders to assume such positions relative to the work to be accomplished as experience or convenience may dictate. The invention consists, second, in a novel construction of and manner of applying and adjusting the drive-wheel axle, whereby it is made to serve as a rigid bar of the main frame, for stiffening and strengthening the same, while at the same time it is made the means of adjusting the height of the frame, as hereinafter described.

To enable others to construct and use my improvements, I will proceed to describe the same with reference to the drawing, in which—

A represents the frame of the machine; B, the main ground-wheel, and B′ the driving spur-wheel secured thereto. The manner of mounting the drive-wheel in the frame is as follows: A′ A′ are longitudinal bars of the main frame, between which the driving-wheel is placed, and the adjacent sides of which have secured to them metal bearing-plates C, provided with parallel flanges *c c*, curved in the arc of a circle, of which the pinion-shaft D is the center, said flanges extending above and below the frame-bars A′ and plates C to any extent desired, to provide for the necessary vertical adjustment of the frame and cutting apparatus, to adapt the machine to both reaping and mowing. E is the drive-wheel axle, the ends of which are squared or flattened, and extend within the grooves formed by the curved flanges *c*, and are perforated to receive pins *c′* passing through said ends and through the flanges *c*, which are also perforated, as shown in Fig. 1, for the purpose of holding the axle at the required point of adjustment. By this construction and manner of securing the axle, it is made to constitute a rigid central transverse frame-bar, serving to materially strengthen and stiffen the frame, and to prevent accidental displacement of the axle or gearing. The pinion-shaft D is provided with a bevel wheel or disk, $D^1$, on the vertical side or face of which are a series (two or more) of concentric rings of cogs or teeth, with either of which a sliding pinion on a driving or crank shaft, $D^2$, may be made to engage, and by means of which the speed of the cutters may be varied, to adapt the machine to reaping or mowing, as required. The frame A is armed with a series of rollers, $a$ $a^1$ $a^2$, to accommodate the endless horizontal and inclined apron or aprons which carry the grain to the binders, the last-named of said rollers—viz., $a^2$—being mounted in uprights F of the frame A, in a position above and outside of the drive-wheel B. F′ are additional uprights attached to frame A at or near the inner end of the cutting apparatus or grain-platform, and near the upper ends of these uprights F F′ are two horizontal transverse bars, G, one in front and the other in rear of the drive-wheel, the outer ends of which bars extend some distance beyond the main frame, overhanging the same on the stubble side, as shown clearly in Fig. 1. H H are pendent parallel links or rods, pivoted at their upper ends to the overhanging bars G, (two to each;) and I is the platform, suspended on links H by a pivotal connection at each of its four corners. By

BEST AVAILABLE COPY this arrangement the platform may be swung inward toward the frame, and lowered by swinging in the arc of a circle, or outward and upward, as may be required to suit the height or convenience of the binders.

Any suitable device may be employed for setting the platform, or it may be allowed to swing freely on links H, as desired. The bars G are perforated vertically at their overhanging end, to permit the adjustment of longitudinal bars G′, constituting supports for the binders, as explained in Patent No. 104,290, issued June 14, 1870; and the attachment of said bars G to uprights F F′ is made by a single bolt, *f*, in each, so that by removing the bolts from uprights F′ the bars G, together with the links H and platform I, may be folded up into a vertical, or nearly vertical, position for transportation, or for passing through gates. The bars G may be made of any suitable material; but I prefer, ordinarily, that they shall be slightly flexible or elastic, to give greater ease to the operator on the platform. The platform is perforated, as shown in Fig. 1, to receive binders' seats J, either additional to the bars G′ or as a substitute therefor. These seats J are mounted on standards *j*, and, in addition to the seat part J, are provided with a fork, J′, or table, upon which the grain may be bound after removing it from the receptacle K, where it is deposited by the discharging-apron. The standard *j* is perforated at various heights to receive pins or stirrups *j′*, to accommodate the foot or limb of the operator.

The object of this last-described construction of support for the binder is to provide fo the want felt by many of our farmers wh suffered loss of limb during the war, and wh are unable to do the work of binding by reaso only of their inability to stand or ride upo the machine, as heretofore constructed.

The construction herein described affords seat, J, a table, J′, and a support or stirru *j′*, in which to rest the disabled limb, thereb enabling the class of persons referred to to d the work equally well with those upon whoı the farming community have heretofore bee entirely dependent.

Parts of the machine not specifically re ferred to may be constructed in any usua manner.

Having now described my invention, wha I claim as new, and desire to secure by Letters Patent, is—

1. The binders' platform I, suspended fron the transverse overhanging bars G, supporte by the main frame, substantially as described 2. The movable binders' seat J, provided with the fork J′ and stirrup *j′*, in combinatio with the binders' stand or platform, as de scribed.

3. The main drive-wheel axle E, provided with the flattened ends, in combination with th grooved segments or flanges *c*, and the through pins, for setting the axle at any desired height and for stiffening the frame, as described.

JOHN H. ELWARD.

Witnesses:
ALEX. MAHON,
JOHN G. CENTER.